US009568706B2

(12) United States Patent
Niiyama et al.

(10) Patent No.: US 9,568,706 B2
(45) Date of Patent: Feb. 14, 2017

(54) LENS BARREL AND ELECTRONIC APPARATUS

(71) Applicant: Olympus Corporation, Hachioji-shi, Tokyo (JP)

(72) Inventors: Tsubasa Niiyama, Hino (JP); Mayu Miki, Musashino (JP); Akinori Nishio, Hachioji (JP); Masahito Watanabe, Hachioji (JP); Masaya Ota, Yokohama (JP)

(73) Assignee: Olympus Corporation, Tokyo (JP)

( * ) Notice: Subject to any disclaimer, the term of this patent is extended or adjusted under 35 U.S.C. 154(b) by 129 days.

(21) Appl. No.: 14/499,644

(22) Filed: Sep. 29, 2014

(65) Prior Publication Data

US 2015/0092282 A1   Apr. 2, 2015

(30) Foreign Application Priority Data

Oct. 1, 2013   (JP) .................. 2013-206594

(51) Int. Cl.
| | |
|---|---|
| G02B 15/14 | (2006.01) |
| G02B 21/02 | (2006.01) |
| G02B 3/02 | (2006.01) |
| G02B 9/60 | (2006.01) |
| G02B 7/09 | (2006.01) |
| G03B 5/00 | (2006.01) |

(52) U.S. Cl.
CPC . *G02B 7/09* (2013.01); *G03B 5/00* (2013.01); *G03B 2205/0046* (2013.01)

(58) Field of Classification Search
CPC ....... G02B 27/0966; G02B 13/18; G02B 9/60; G02B 13/00; G02B 13/02; G02B 13/04; G02B 21/02
USPC ....... 359/700, 714, 763, 764, 756, 766, 757, 359/746, 753, 659
See application file for complete search history.

(56) References Cited

U.S. PATENT DOCUMENTS

| | | | | |
|---|---|---|---|---|
| 2007/0183764 A1* | 8/2007 | Imura | ............... | G03B 5/02 396/55 |
| 2012/0086821 A1* | 4/2012 | Yasutomi | ............... | G02B 7/08 348/208.4 |

FOREIGN PATENT DOCUMENTS

| | | | |
|---|---|---|---|
| JP | 57097505 A | * | 6/1982 |
| JP | 2006-208618 | | 8/2006 |

* cited by examiner

*Primary Examiner* — Dawayne A Pinkney
(74) *Attorney, Agent, or Firm* — John C. Pokotylo; Straub & Pokotylo

(57) ABSTRACT

A lens barrel of the present invention is a lens barrel holding a photographing optical system which is a zoom lens constituted by five groups and includes: a cylindrical cam barrel arranged to be rotatable around an optical axis; a first lens driving section driving the cam barrel around the optical axis; a plurality of first cam grooves carved on an outer circumferential surface of the cam barrel; and a plurality of second cam grooves carved on an inner circumferential surface of the cam barrel. A first lens group holding barrel has a plurality of cam followers that are recessed in the first cam grooves; and each of a second lens group holding barrel and a third lens group holding barrel has a plurality of cam followers that are recessed in the second cam grooves.

7 Claims, 16 Drawing Sheets

LENS BARREL AND ELECTRONIC APPARATUS

CROSS REFERENCE TO RELATED APPLICATION

This application claims the benefit of Japanese Application No. 2013-206594 filed in Japan on Oct. 1, 2013, the contents of which are incorporated herein by this reference.

BACKGROUND OF THE INVENTION

1. Field of the Invention

The present invention relates to an extendable zoom lens barrel and an electronic apparatus provided with the lens barrel.

2. Description of the Related Art

There may be a case where a lens barrel capable of shortening a total length thereof when in a state of not taking photographs, for example, as disclosed in Japanese Patent Application Laid-Open Publication No. 2046-208618, is used in order to realize downsizing of an image pickup apparatus such as a camera and a video camera.

The lens barrel disclosed in Japanese Patent Application Laid-Open Publication No. 2006-208618 is provided with three substantially cylindrical barrel members provided with cam grooves, and the lens barrel is configured to drive three groups of lenses in an optical axis direction by the cam grooves.

SUMMARY OF THE INVENTION

A lens barrel of an aspect of the present invention is a lens barrel holding a photographing optical system which is a zoom lens constituted by five groups of a first lens group with positive refractive power, a second lens group with negative refractive power, a third lens group with positive refractive power, a fourth lens group with negative refractive power and a fifth lens group with positive refractive power, the lens barrel being capable of shortening a total length thereof when not taking photographs, including: a cylindrical cam barrel arranged to be rotatable around an optical axis; a first lens driving section driving the cam barrel around the optical axis at a time of a magnification changing operation of the photographing optical system; a plurality of first cam grooves carved on an outer circumferential surface of the cam barrel; and a plurality of second cam grooves carved on an inner circumferential surface of the cam barrel. A first lens group holding barrel holding the first lens group has a plurality of cam followers that are recessed in the first cam grooves; and each of a second lens group holding barrel holding the second lens group and a third lens group holding barrel holding the third lens group has a plurality of cam followers that are recessed in the second cam grooves.

An electronic apparatus of an aspect of the present invention is provided with the lens barrel and an image pickup device.

DETAILED DESCRIPTION OF THE PREFERRED EMBODIMENT

Figure 1:
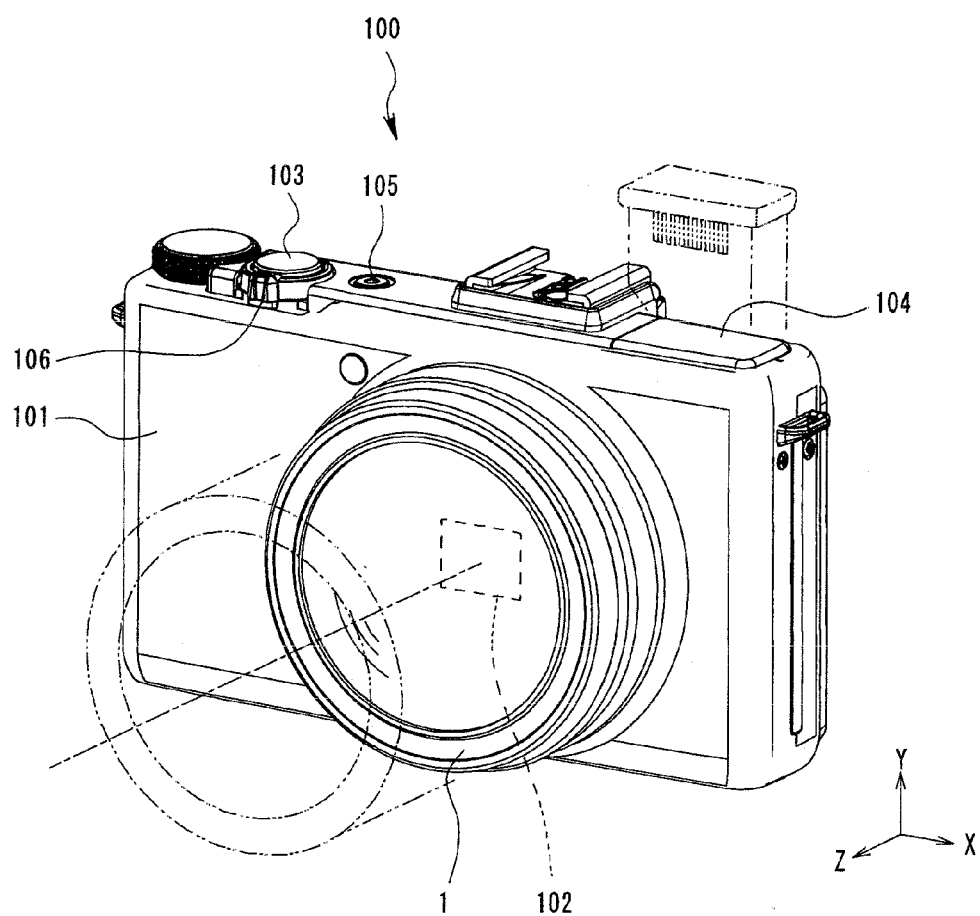
FIG. 1 is a perspective view of an image pickup apparatus provided with a lens barrel.

A preferred embodiment of the present invention will be described below with reference to drawings. Note that, in each of figures used for description below, a scale differs according to components so that each component has a size recognizable on the drawing. The present invention is not limited only to the number of the components shown in the figures, shapes of the components, size ratio of the components, and relative positional relationships among the respective components.

A lens barrel 1 of the present invention is used in an electronic apparatus equipped with an image pickup function, for example, a digital camera, a digital video camera or the like, and the lens barrel 1 holds a photographing optical system constituted by a plurality of lenses.

FIG. 1 shows an external appearance of a digital camera 100 which is an example of an electronic apparatus provided with the lens barrel 1 of the present invention. Note that, hereinafter, an axis parallel to an optical axis O of the photographing optical system constituted by the plurality of lenses and the like held by the lens barrel 1 is assumed to be a Z axis, and two axes orthogonal to each other on a plane orthogonal to the Z axis are assumed to be an X axis and a Y axis, respectively. When the digital camera 100 is held in a so-called upright state, the Z and X axes are horizontal axes, and the Y axis is a vertical axis. The X, Y and Z axes are shown in each figure appropriately. As for directions along the Z axis, an object side (side of an object to be photographed) is assumed as the front, and an image side (an image pickup device side) is assumed as the back.

A camera body 101 of the digital camera 100 is provided with the lens barrel 1, an image pickup device 102, a release switch 103, a strobe unit 104, a power source switch 105 and a zoom operation switch 106.

The strobe unit 104 is housed in the camera body 101 when it is not used and is arranged to project upward of the digital camera 100 held in an upright state when it is used. The strobe unit 104 is arranged on a right side of the lens barrel 1 when the digital camera 100 in the upright state is seen from the front.

Note that, though the lens barrel 1 and the image pickup device 107 are built in the camera body 101 of the digital camera 100 in the present embodiment, at least one of the lens barrel 1 and the image pickup device 102 may be in a form of being attachable to and detachable from the camera body 101. For example, the digital camera 100 may be configured such that at least one of the lens barrel 1 and the image pickup device 102 is exchangeable with one having different specifications.

Figure 2:
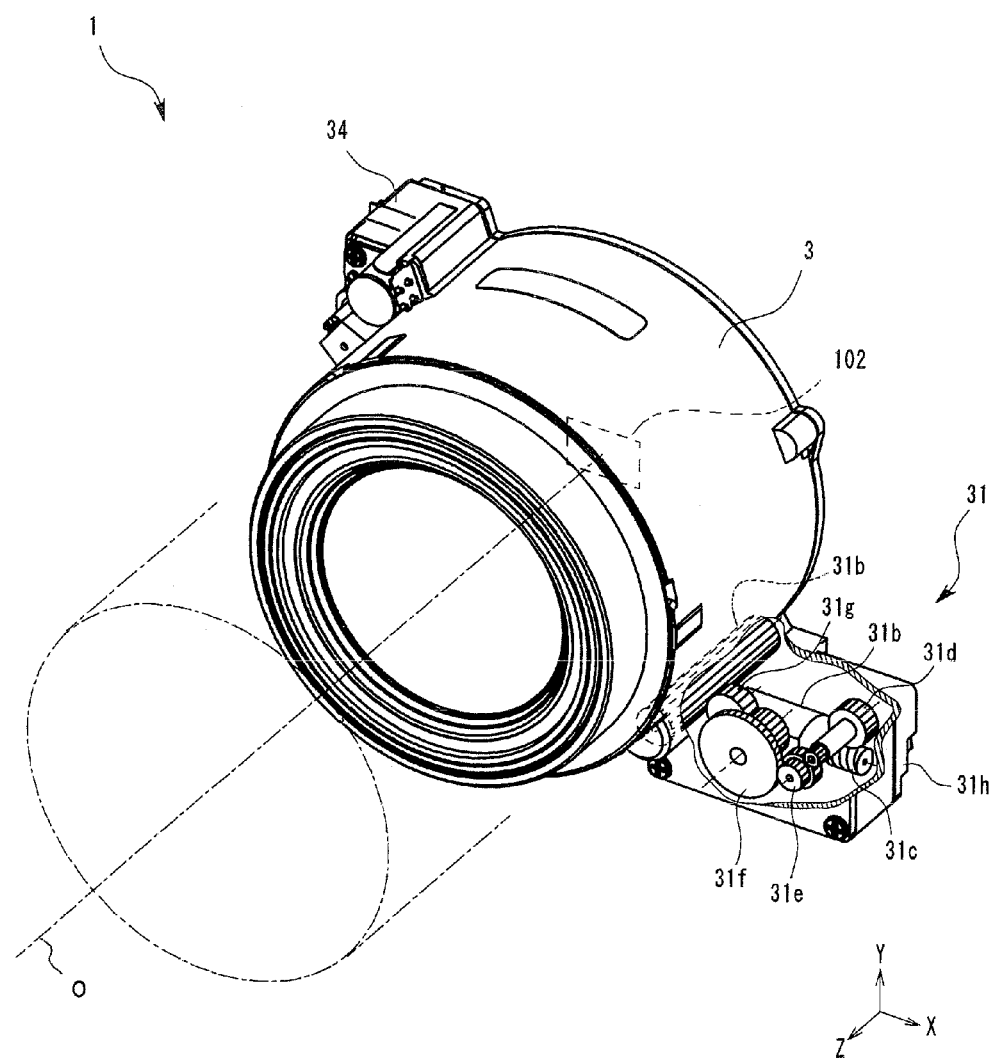
FIG. 2 is a perspective view of the lens barrel.

As schematically shown in FIG. 2, the lens barrel 1, which is an embodiment of the present invention, can change between two states: a photographing enabled state in which a plurality of barrel members holding the photographing optical system are pulled frontward (object side) to enable formation of an image on an image surface by the photographing optical system, and a shortened state in which the plurality of barrel members are pulled backward (the body side of the digital camera 100), and a total length in a Z axis direction is shorter than in the photographing state.

Figure 4:
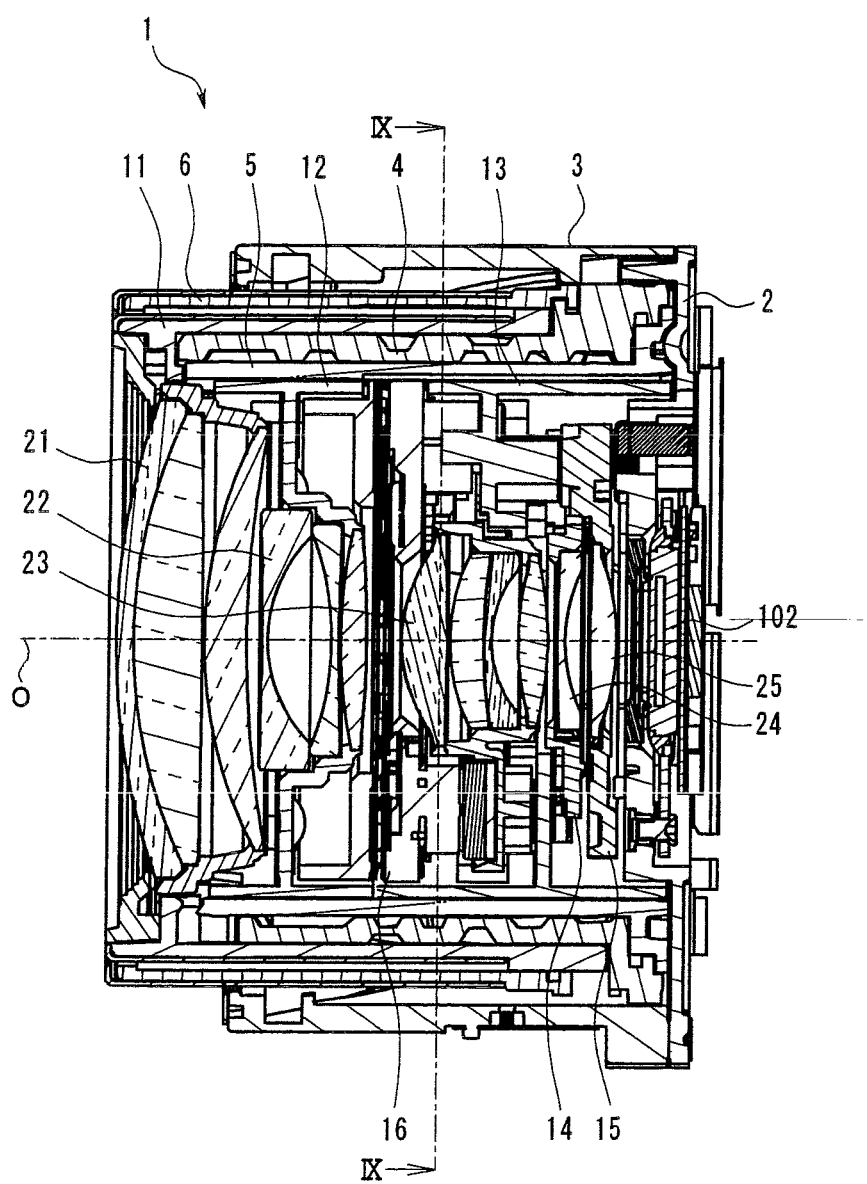
FIG. 4 is a longitudinal sectional view along an optical axis of the lens barrel which is in a shortened state.
Figure 5:
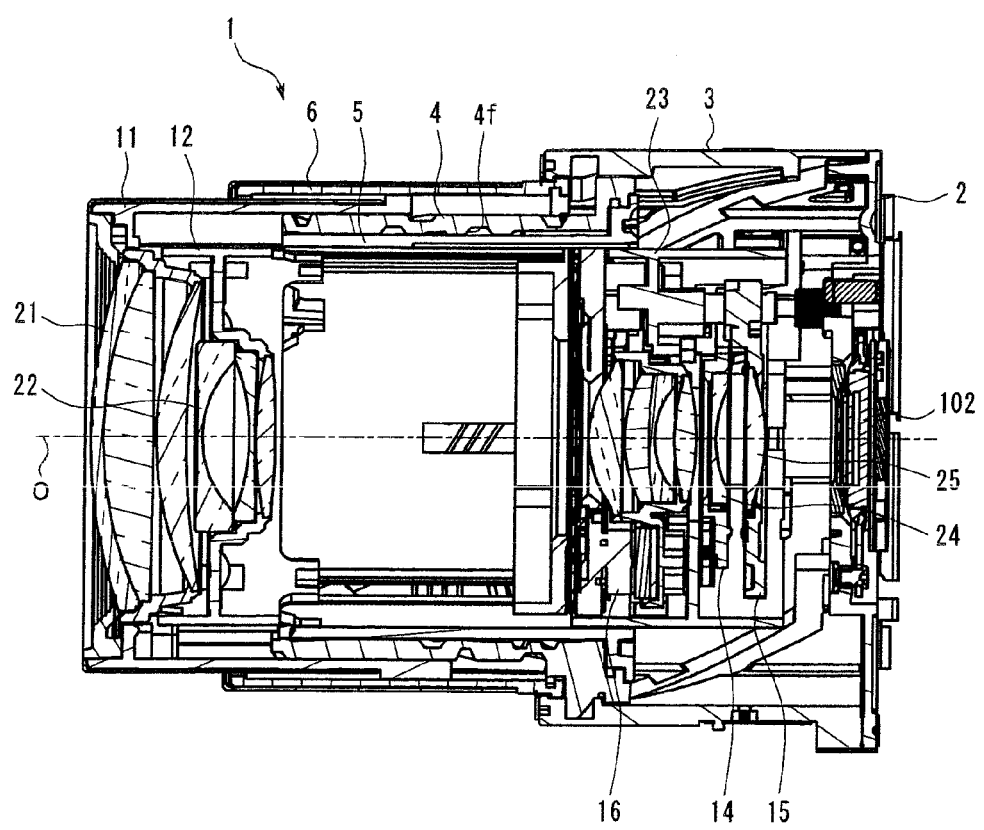
FIG. 5 is a longitudinal sectional view along the optical axis of the lens barrel which is in a wide end state.
Figure 6:
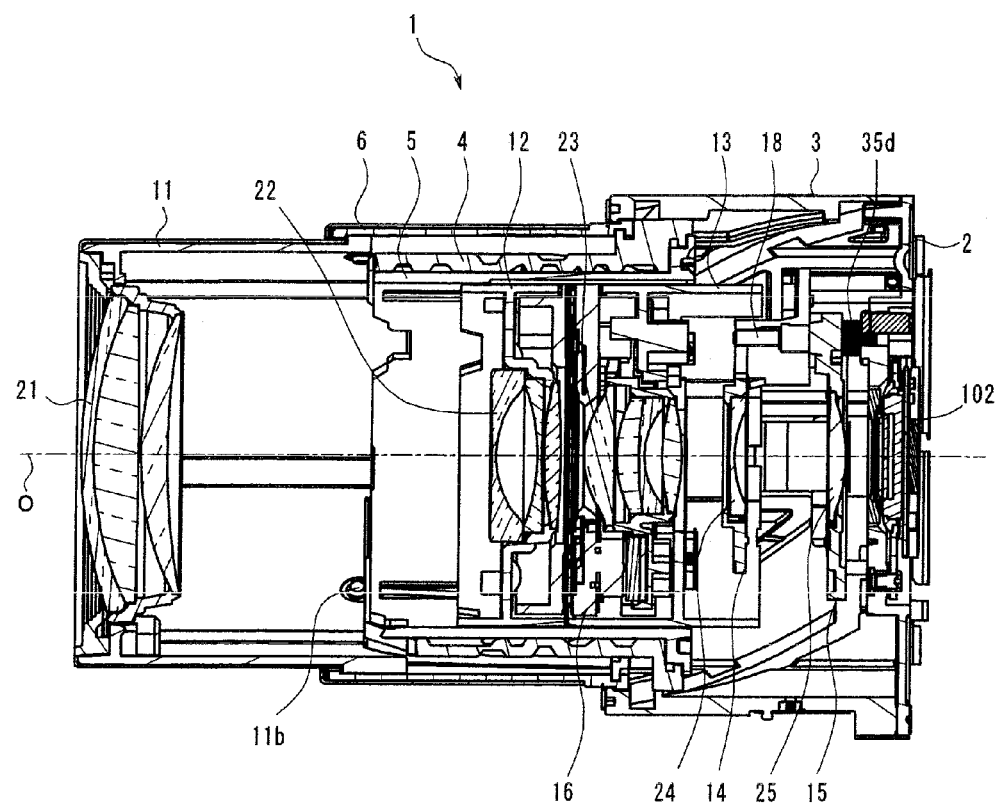
FIG. 6 is a longitudinal sectional view along the optical axis of the lens barrel which is in a tele end state.

The photographing optical system is a zoom lens the focal distance of which can be changed, and the lens barrel 1 is capable of changing the focal distance of the photographing optical system by causing the plurality of barrel members to move along the optical axis O. FIG. 4 is a sectional view in the case where the lens barrel 1 is in the shortened state. FIG. 5 is a sectional view in the case where the lens barrel 1 is in the photographing state, and the focal distance of the photographing optical system is a wide end which is the shortest. FIG. 6 is a sectional view in the case where the lens barrel 1 is in the photographing state, and the focal distance of the photographing optical system is a tele end, which is the longest. Though details will be described later, an operation of switching between the shortened state and the photographing state of the lens barrel 1 and an operation of changing the focal distance are performed mainly by power of a zoom driving motor 31*a*, which is an electric motor included in a zoom driving unit 31.

Figure 7:
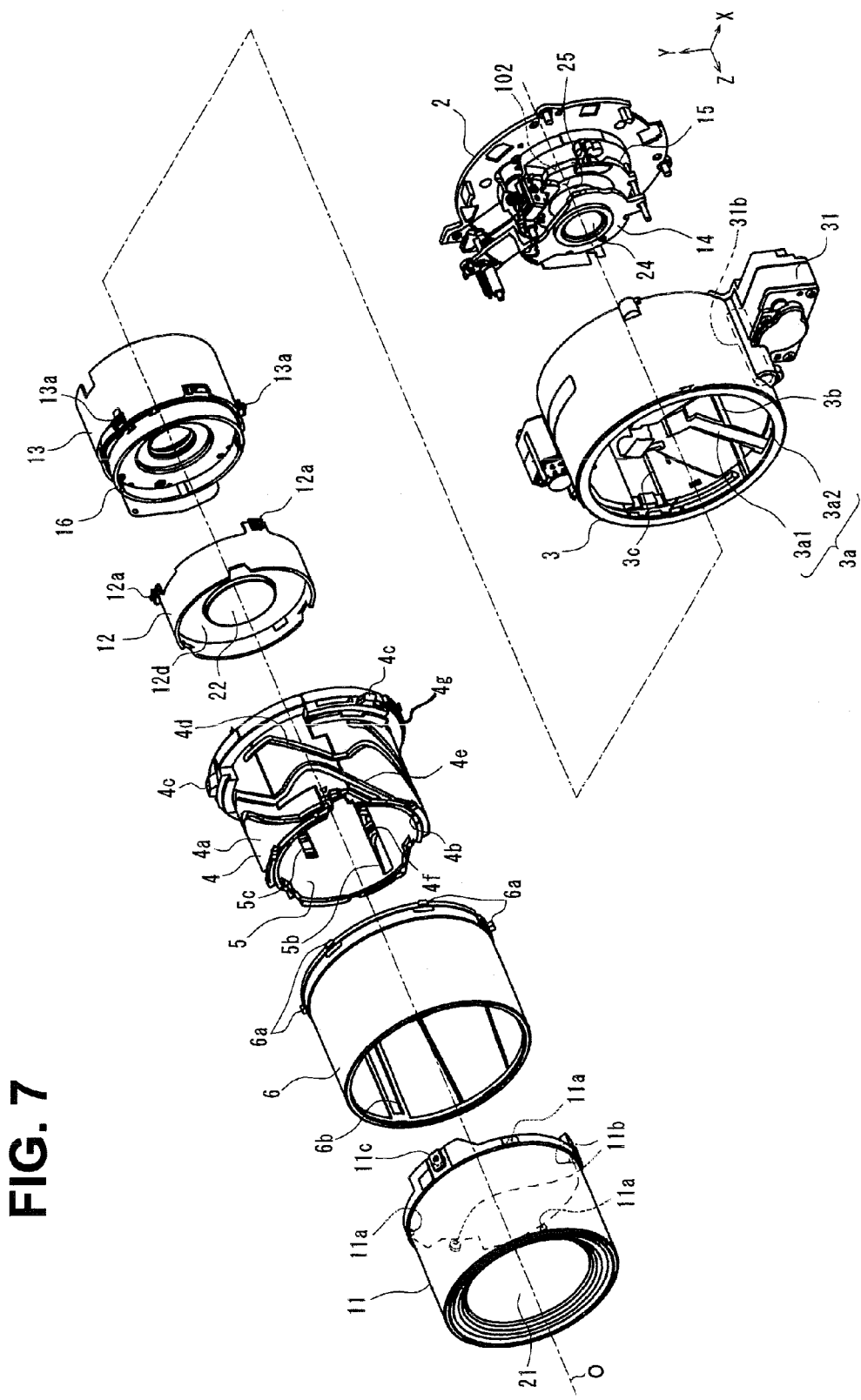
FIG. 7 is an exploded perspective view of the lens barrel.
Figure 8:
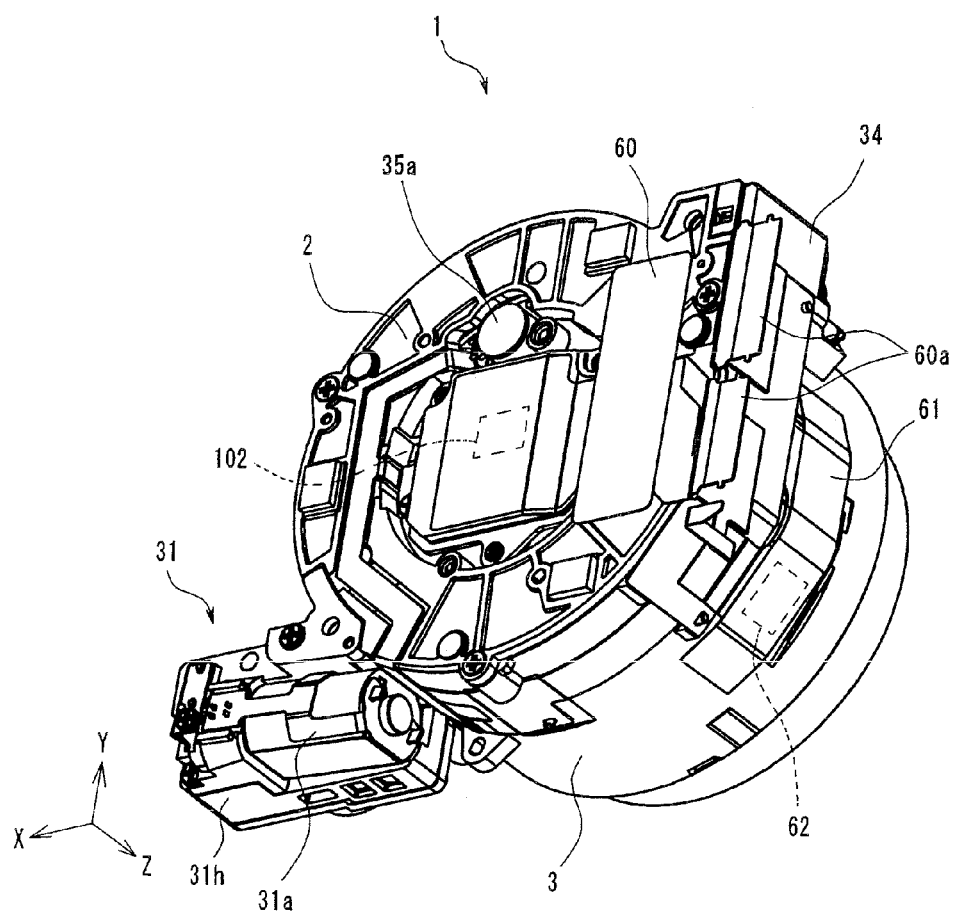
FIG. 8 is a perspective view showing a back of the lens barrel.
Figure 9:
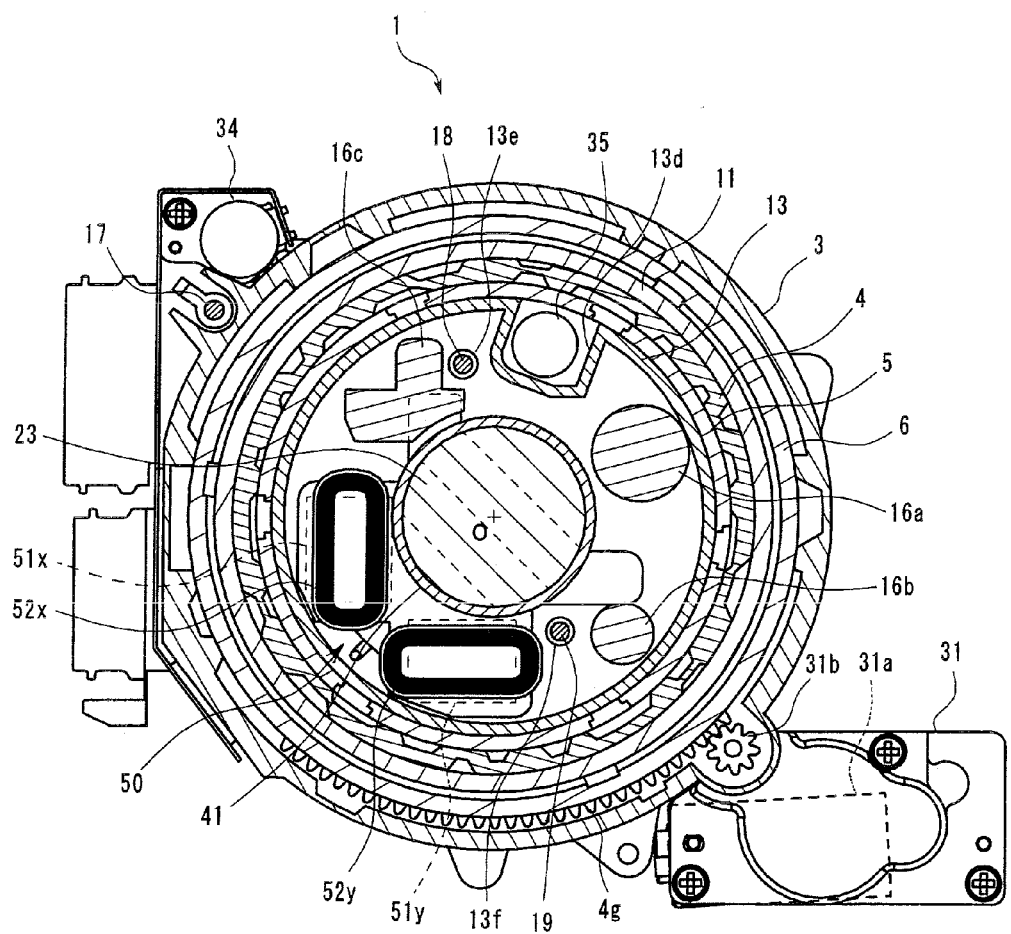
FIG. 9 is a sectional view of the lens barrel which is in the shortened state, with a plane orthogonal to the optical axis O as a section (a sectional view of a IX-IX section in FIG. 4)
Figure 9:
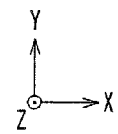
Figure 10:
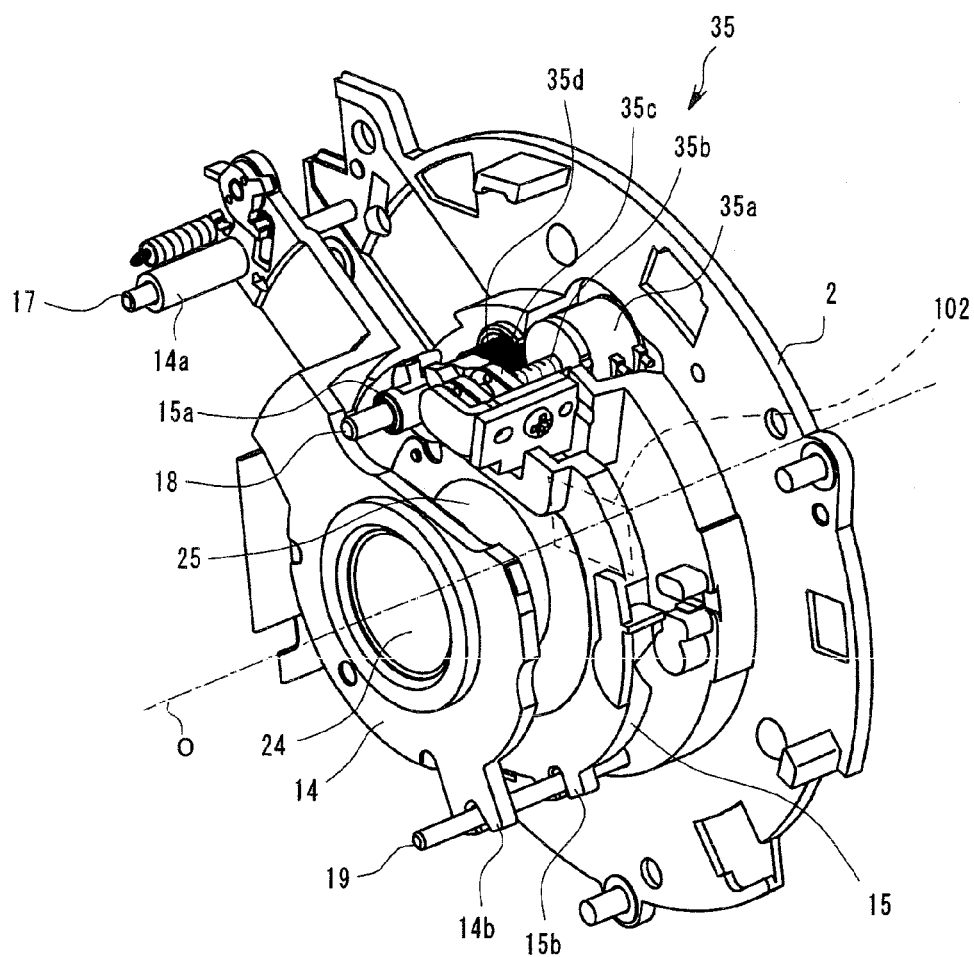
FIG. 10 is a perspective view of a base section enlarged.
Figure 10:
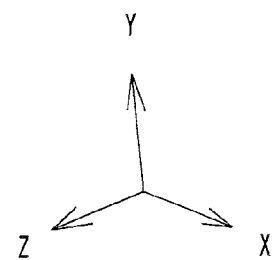

FIG. 7 is an exploded perspective view of the lens barrel 1. FIG. 8 is a perspective view showing a back of the lens barrel 1. FIG. 9 is a sectional view with a plane orthogonal to the optical axis O as a section (a sectional view of a TX-TX section in FIG. 4). FIG. 10 is a perspective view of the base section 2 enlarged.

The photographing optical system held by the lens barrel 1 is constituted by five groups of a first lens group 21 with positive refractive power, a second lens group 22 with negative refractive power, a third lens group 23 with positive refractive power, a fourth lens group 24 with negative refractive power and a fifth lens group 25 with positive refractive power. A shutter/diaphragm unit 16 equipped with a shutter mechanism and a diaphragm mechanism is arranged between the second lens group 22 and the third lens group 23. The shutter/diaphragm unit 16 of the present embodiment is equipped with a mechanism for selectively arranging an ND filter on the optical axis O.

The first lens group 21 has a role of correcting an image surface position by moving in an optical axis O direction at the time of a magnification changing operation. The second lens group 22 and the third lens group 23 have a role of changing magnification by moving in the optical axis O direction.

The lens barrel 1 is provided with a first lens group holding barrel 11, a second lens group holding barrel 12, a third lens group holding barrel 13, a fourth lens group holding barrel 14 and a fifth lens group holding barrel 15 holding the first lens group 21, the second lens group 22, the third lens group 23, the fourth lens group 24 and the fifth lens group 25, respectively. The shutter/diaphragm unit 16 is arranged in the third lens group holding barrel 13.

Though details will be described later, the lens barrel 1 is provided with a lens shifting mechanism section 40 which realizes a so-called lens-shift-method image stabilization function which is a function of causing an image to move on an image forming surface by causing the third lens group 23, which is a lens group for shifting, to move in parallel to the plane orthogonal to the optical axis O. The lens shifting mechanism section 40 is arranged in the third lens group holding barrel 13.

The lens barrel 1 is provided with: a base section 2 which holds the image pickup device 102; a fixed barrel 3 fixed to the base section 2; a cam barrel 4 which is supported by the fixed barrel 3 and is rotation-driven at the time of a zooming operation or at the time of a barrel collapsing operation as well as being forward/backward driven in a direction along the optical axis O; a float key 5 which moves forward or backward in the direction along the optical axis O together with the cam barrel 4 in a rotation restricting state; a guide barrel 6 which moves forward or backward in the direction along the optical axis O together with the cam barrel 4 in the rotation restricting state; a zoom driving unit 31, which is a first lens driving section for rotation-driving the cam barrel 4; a fourth lens group driving unit 34 which forward/backward drives a fourth lens group holding barrel 14 in the direction along the optical axis O; and a fifth lens group driving unit 35, which is a second lens driving section for forward/backward driving a fifth lens group holding barrel 15 in the direction along the optical axis O. The first lens group holding barrel 11, the second lens group holding barrel 12 and the third lens group holding barrel 13 are in the rotation restricting state and are moved forward or backward in the direction along the optical axis O by rotation of the cam barrel 4.

Details of each component of the lens barrel 1 will be described below.

The base section 2 is a substantially flat board member and holds the image pickup device 102 on the optical axis O. That is, a position of the base section 2 is fixed relative to an image surface of the photographing optical system which is in the photographing enabled state. As enlargedly shown in FIG. 10, guide shafts 17 and 18 which forward or backward movably guide the fourth lens group holding barrel 14 and the fifth lens group holding barrel 15 in the direction along the optical axis O are vertically arranged at a front of the base section 2. The guide shafts 17 and 18 are round bar members having circular sections and are fixed to the base section 2 such that their central axes are parallel to the optical axis O. On the fourth lens group holding barrel 14 and the fifth lens group holding barrel 15, bearing sections which slide along the guide shafts 17 and 18, respectively, are formed.

At the front of the base section 2, a rotation stopping shaft 19 is vertically arranged which restricts rotation of the fourth lens group holding barrel 14 and the fifth lens group holding barrel 15 around the guide shafts 17 and 18. The rotation stopping shaft 19 is a round bar member having a circular section and is fixed to the base section 2 such that its central axis is parallel to the optical axis O. On the fourth lens group holding barrel 14 and the fifth lens group holding barrel 15, bearing sections which slide along the rotation stopping shaft 19 are formed.

The fifth lens group driving unit 35, which is the second lens driving section, is also arranged on the base section 2. The fifth lens group driving unit 35 is configured, being provided with a stepping motor 35a having an rotating output shaft; a screw 35b, a male screw which rotationally moves together with the output shaft of the stepping motor 35a; and a nut 35c having a female screw section which is screwed on the screw 35b.

The screw 35b projects frontward from the front of the base section 2 and is arranged such that its rotation axis is parallel to the optical axis O. Rotation of the nut 35c is restricted, and the nut 35c moves forward or backward in the direction along the optical axis O accompanying rotation of the screw 35b. The fifth lens group holding barrel 15 is biased by a coil spring 35d to be in contact with the nut 35c and moves forward or backward in the direction along the optical axis O accompanying movement of the nut 35c.

The guide shaft 18 which guides the fifth lens group holding barrel 15, the rotation stopping shaft 19, and the fifth lens group driving unit 35 which drives the fifth lens group holding barrel 15 are arranged at positions on an inner side of an outer diameter of the third lens group holding barrel 13 to be described later when seen from the direction along the optical axis O.

The fixed barrel 3 is a member fixed to the camera body 101 and the base section 2 and is arranged on a most outer circumference among a plurality of substantially cylindrical barrel members constituting the lens barrel 1. On an inner circumferential surface of the substantially cylindrically shaped fixed barrel 3, cam grooves 3a, rectilinear grooves 3b and 3c are carved. The cam groove 3a is constituted by an inclined groove 3a1 formed in a direction inclined relative to the optical axis O and a circumferential groove 3a2 formed in a circumferential direction, which are connected with each other. Cam followers 4c provided on an outer circumferential surface 4a of the cam barrel 4 to be described later are slidably engaged in the cam grooves 3a. The rectilinear grooves 3b and 3c are rectilinear grooves parallel to the optical axis O. Protruding portions provided on an outer circumferential surface of the float key 5 to be described later are slidably recessed in the rectilinear grooves 3b. Protruding portions 6a provided on an outer circumferential surface of the guide barrel 6 to be described later are slidably recessed in the rectilinear grooves 3c.

Figure 3:
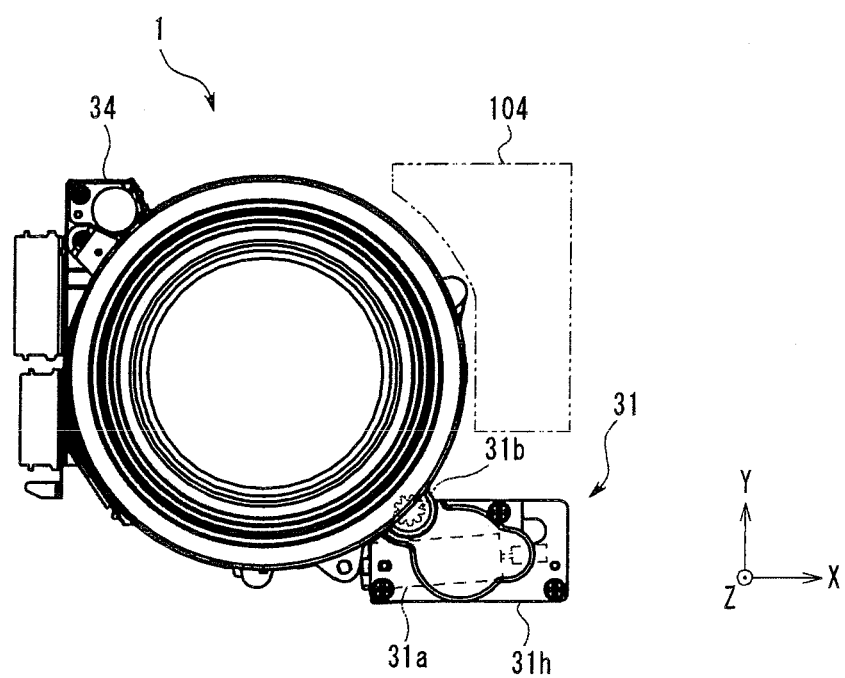
FIG. 3 is a front view of the lens barrel.

The zoom driving unit 31 and the fourth lens group driving unit 34 are arranged on an outer circumference of the fixed barrel 3. As shown in FIG. 3, the zoom driving unit 31 and the fourth lens group driving unit 34 are arranged at opposite positions with the optical axis O therebetween when seen from the front of the lens barrel 1. When the digital camera 100 in an upright state is seen from the front, the zoom driving unit 31 is arranged at a lower right position relative to the optical axis O, and the fourth lens group driving unit 34 is arranged at an upper left position relative to the optical axis O.

In the digital camera 100, the zoom driving unit 31 projects from a lower part of the lens barrel 1 toward a right side, and the strobe unit 104 is arranged in a space on an upper side of the zoom driving unit 31.

The zoom driving unit 31 includes the zoom driving motor 31a, a long gear 31b and a plurality of gears to be described below. The long gear 31b is a pinion gear having a rotation axis parallel to the optical axis O and is exposed to the inner circumference of the fixed barrel 3 as shown in FIG. 9. The long gear 31b meshes with a gear section 4g provided on an outer circumference of the cam barrel 4. The zoom driving motor 31a is a servomotor which generates power for rotation-driving the long gear 31b. The power of the zoom driving motor 31a is transmitted to the long gear 31b via a transmission gear mechanism constituted by a plurality of gears shown in FIG. 2. The zoom driving motor 31a and the transmission gear mechanism are housed in a gear box 31h provided projecting from an outer circumferential surface of the fixed barrel 3. The transmission gear mechanism is constituted by a worm screw 31c, a worm wheel 31d, a first Z gear 31e, a second Z gear 31f and an idle gear 31a.

The zoom driving motor 31a is arranged such that its rotation axis is substantially parallel to a plane (an XY plane) orthogonal to the optical axis O on a rear side of the gear box 31h. The worm screw 31c is fixed to the rotation axis of the zoom driving motor 31a. The worm wheel 31d which meshes with the worm screw 31c is arranged such that its rotation axis is parallel to the optical axis O. Thus, an output rotation axis of the zoom driving motor 31a is bent by about 90 degrees by a so-called worm drive mechanism.

The first Z gear 31e, the second Z gear 31f and the idle gear 31g are arranged on a frontward side of the zoom driving motor 31a in the gear box 31h such that their rotation axes are parallel to the optical axis O. The first Z gear 31e meshes with the worm wheel 31d, and the idle gear 31g meshes with the long gear 31b. Rotation of the worm wheel 31d is transmitted to the long gear 31b via the first Z gear 31e, the second Z gear 31f and the idle gear 31g.

In the present embodiment, by providing a so-called two-story structure in which the zoom driving motor 31a, the first Z gear 31e, the second Z gear 31f and the idle gear 31g are arranged so that the zoom driving motor 31a is overlapped with the first Z gear 31e, the second Z gear 31f and the idle gear 31g in the direction of the optical axis O, in the gear box of the zoom driving unit 31, a Y-direction height of the gear box 31h is suppressed. That is, in the present embodiment, a vertical height of the gear box 31h when the digital camera 100 in the upright state is seen from the front can be reduced. Thereby, it is possible to vertically secure a large space where the strobe unit 104 (shown in FIG. 3) is arranged above the gear box 31h.

The fourth lens group driving unit 34 is configured, being provided with a stepping motor 34a having a rotating output shaft, a screw not shown, which is a male screw which rotates together with the output shaft of the stepping motor 34a, and a nut not shown, which has a female screw section which meshes with the screw.

The fourth lens group driving unit 34 is configured to rotation-drive the screw by the stepping motor 34a and forward/backward drive the nut in the direction along the optical axis O, similarly to the fifth lens group driving unit 15 stated before. The fourth lens group driving unit 34 moves forward or backward in the direction along the optical axis O together with the nut.

The cam barrel 4 is a substantially cylindrical member and engaged in an inner circumferential part of the fixed barrel 3 rotationally and forward/backward movably.

At a rear part of the outer circumferential surface 4a of the cam barrel 4, the plurality of cam followers 4c which are slidably engaged in the plurality of cam grooves 3a of the fixed barrel 3, respectively, and a gear section 4g which is engaged with the long gear 31b of the zoom driving unit 31 are formed.

As stated before, the cam followers 4c of the cam barrel 4 are slidably engaged in the cam grooves 3a of the fixed barrel 3, and the gear section 4g is engaged with the long gear 31b Therefore, the cam barrel 4 rotates by power of the zoom driving unit 31. When the cam barrel 4 rotates, the cam followers 4c of the cam barrel 4 move along the cam grooves 3a of the fixed barrel 3.

When the cam barrel 4 rotates counterclockwise when seen from the front while the lens barrel 1 is in the shortened state, the cam barrel 4 advances while rotating within a range where the cam followers 4c are recessed in the inclined grooves 3a1. Within a range where the cam followers 4c are recessed in the circumferential grooves 3a2, the cam barrel 4 rotates without moving forward or backward in the direction along the optical axis O.

Here, the cam followers 4c are recessed in the inclined grooves 3a1 during a period from the lens barrel 1 being in the shortened state shown in FIG. 4 until immediately before the lens barrel 1 transitions to a wide end state shown in FIG. 5, which is the photographing enabled state. When the lens barrel 1 is in the photographing enabled state, that is, when the lens barrel 1 is between the wide end state shown in FIG. 5 and a tele end state shown in FIG. 6, the cam followers 4c are recessed in the circumferential grooves 3a2. That is, when the lens barrel 1 is in the photographing enabled state, the cam barrel 4 is driven only in a rotation direction by the zoom driving unit 31 without moving forward or backward in the direction along the optical axis O.

Figure 11:
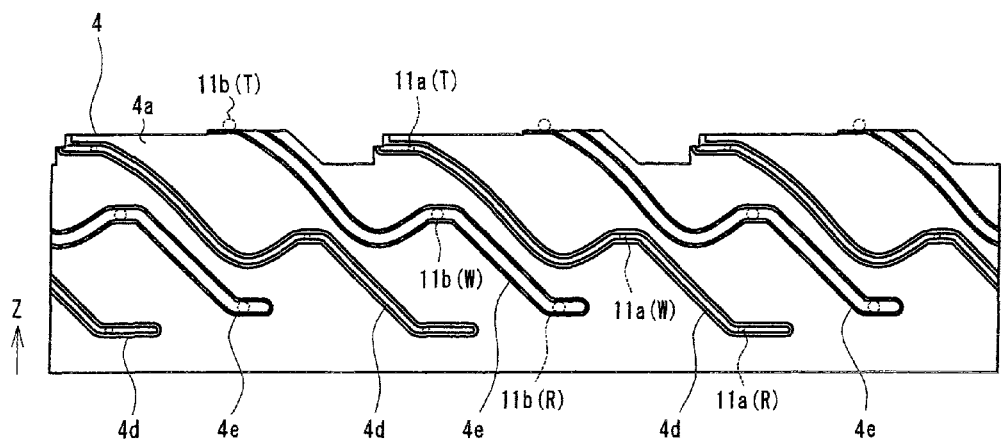
FIG. 11 is a diagram showing a cam profile when an outer circumferential surface of a cam barrel is developed.
Figure 12:
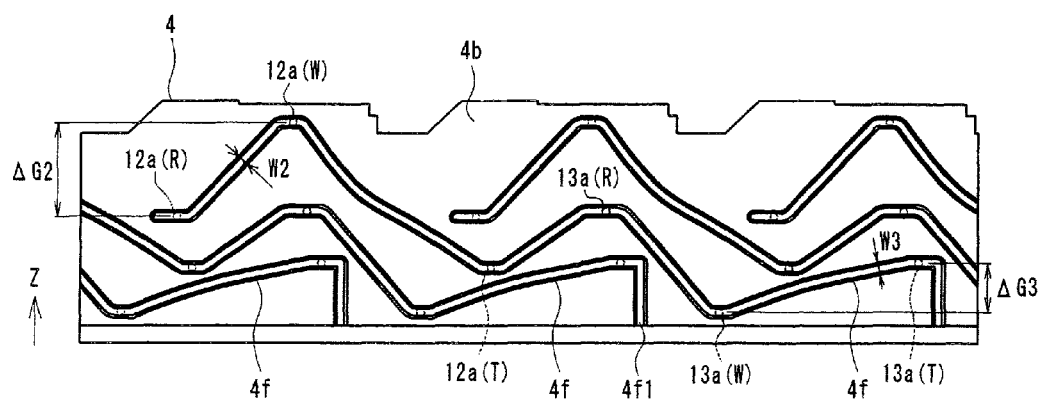
FIG. 12 is a diagram showing a cam profile when an inner circumferential surface of the cam barrel is developed.

On the outer circumferential surface 4a and an inner circumferential surface 4b of the cam barrel 4, a plurality of cam grooves are carved as shown in FIGS. 11 and 12. FIG. 11 is a development view in which a cylindrical surface part of the outer circumferential surface 4a of the cam barrel 4 is developed on a plane, and FIG. 12 is a development view in which the inner circumferential surface 4b, which is a cylindrical surface of the cam barrel 4, is developed on a plane.

A total of six cam grooves of three first main cam grooves 4d having a same cam profile and three first subordinate cam grooves 4e having a same cam profile are carved on the outer circumferential surface 4a of the cam barrel 4. The first main cam grooves 4d and the first subordinate cam grooves 4e are alternately provided in the circumferential direction.

The cam barrel 4 is recessed on an inner side of the first lens group holding barrel 11. Main cam followers 11a and subordinate cam followers 11b, which are projectingly provided on an inner circumferential surface of the first lens group holding barrel 11, are slidably recessed in the first main cam grooves 4d and the first subordinate cam grooves 4e.

On the inner circumferential surface 4b of the cam barrel 4, three second cam grooves 4f having a same cam profile are carved. Cam followers 12a projectingly provided on an outer circumferential surface of the second lens group holding barrel 12 and cam followers 13a projectingly provided on an outer circumferential surface of the third lens group holding barrel 13 are slidably recessed in the second cam grooves 4f.

Details of the plurality of cam grooves formed on the cam barrel 4 and the cam followers to be recessed in the cam grooves are to be described later.

The float key 5 is formed in a cylindrical shape, and it is relatively rotationally engaged in an inner circumferential part of the cam barrel 4. FIG. 7 shows a state that the float key 5 is recessed in the cam barrel 4.

On an outer circumferential part of a rear-side end part of the float key 5, protruding portions which are slidably engaged in the rectilinear grooves 3b of the fixed barrel 3 are provided. By the protruding portions being slidably engaged in the rectilinear grooves 3b of the fixed barrel 3, rotation of the float key 5 around the optical axis O relative to the fixed barrel 3 is restricted.

The float key 5 is capable of performing relative rotation around the optical axis O relative to the cam barrel 4 and is engaged with the cam barrel 4 so as not to perform relative forward/backward movement in the direction along the optical axis O relative to the cam barrel 4.

On a cylindrical part of the float key 5 which is recessed in the cam barrel 4, three rectilinear slits 5b and three rectilinear slits 5c, with a direction parallel to the optical axis O as a longitudinal direction, are formed. The rectilinear slits 5b and 5c penetrate the inner and outer circumferential surfaces of the float key 5. The rectilinear slits 5b and 5c are alternately arranged in a circumference direction.

The second lens group holding barrel 12 and the third lens group holding barrel 13 are recessed on an inner side of the float key 5. On the inner side of the float key 5, the second lens group holding barrel 12 is positioned frontward of the third lens group holding barrel 13.

Cam followers 12a projectingly provided on the outer circumferential surface of the second lens group holding barrel 12 slidably pass through the rectilinear slits 5b. Thereby, though the second lens group holding barrel 12 is restricted in rotation around the optical axis O relative to the fixed barrel 3 but can move forward or backward in the direction parallel to the optical axis O. Cam followers 13a projectingly provided on the outer circumferential surface of the third lens group holding barrel 13 slidably pass through the rectilinear slits 5c. Thereby, though the third lens group holding barrel 13 is restricted in rotation around the optical axis O relative to the fixed barrel 3 but can move forward or backward in the direction parallel to the optical axis O.

As stated before, the cam followers 12a and the cam followers 13a which the second lens group holding barrel 12 and the third lens group holding barrel 13 have are slidably recessed in the second cam grooves 4f formed on the inner circumferential surface 4b of the cam barrel 4. Therefore, when the cam barrel 4 rotates around the optical axis O, the second lens group holding barrel 12 and the third lens group holding barrel 13 move forward or backward in the direction parallel to the optical axis O along the shape of the second cam grooves 4f.

The guide barrel 6 is a substantially cylindrical member and is arranged on an outer side of the first lens group holding barrel 11 and on an inner side of the fixed barrel 3. On an outer circumferential part of a rear-side end part of the guide barrel 6, the protruding portions 6a which are slidably engaged in the rectilinear grooves 3c of the fixed barrel 3 are provided. By the protruding portions 6a being slidably engaged in the rectilinear grooves 3c of the fixed barrel 3, rotation of the guide barrel 6 around the optical axis O relative to the fixed barrel 3 is restricted.

The guide barrel 6 is capable of performing relative rotation around the optical axis O relative to the cam barrel 4 and is engaged with the cam barrel 4 not to perform relative forward/backward movement in the direction along the optical axis O relative to the cam barrel 4.

A rectilinear groove 6b, which is a rectilinear groove parallel to the optical axis O, is formed on an inner circumferential surface of the guide barrel 6. A protruding portion 11c provided on an outer circumferential surface of the first lens group holding barrel 11 is slidably recessed in the rectilinear groove 6b. Thereby, though the first lens group holding barrel 11 is restricted in rotation around the optical axis O relative to the fixed barrel 3 but can move forward or backward in the direction parallel to the optical axis O.

As stated before, the main cam followers 11a and the subordinate cam followers 11b which the first lens group holding barrel 11 has are slidably recessed in the first main earn grooves 4d and the first subordinate earn grooves 4e formed on the outer circumferential surface 4a of the cam barrel 4. Therefore, when the cam barrel 4 rotates around the optical axis O, the first lens group holding barrel 11 moves forward or backward in the direction parallel to the optical axis O along the shapes of the first main cam grooves 4d and the first subordinate cam grooves 4e.

Next, details of the plurality of cam grooves formed on the cam barrel 4 will be described.

As shown in FIG. 11, on the outer circumferential surface 4a of the cam barrel 4, the three first main cam grooves 4d and the three first subordinate cam grooves 4e are alternately formed in the circumferential direction. The first main cam grooves 4d and the first subordinate cam grooves 4e have the same cam profile, and the first subordinate cam grooves 4e are arranged frontward of the first main cam grooves 4d. In the present embodiment, by mutually offsetting the first main cam grooves 4d and the first subordinate cam grooves 4e in a front-back direction as described above, it is possible to form six cam grooves having the same cam profile.

The main cam followers 11a and the subordinate cam followers 11b of the first lens group holding barrel 11 are slidably recessed in the first main cam grooves 4d and the first subordinate cam grooves 4e. In FIG. 11, a position of the main cam follower 11a when the lens barrel 1 is in the shortened state is denoted by reference mark 11a(R); a position of the main cam follower 11a when the lens barrel 1 is in the wide end state is denoted by reference mark 11a(W); and a position of the main cam follower 11a when the lens barrel 1 is in the tele end state is denoted by reference mark 11a(T) In FIG. 11, a position of the subordinate cam follower 11b when the lens barrel 1 is in the shortened state is denoted by reference mark 11b(R); a position of the subordinate cam follower 11b when the lens barrel 1 is in the wide end state is denoted by reference mark 11b(W); and a position of the subordinate cam follower 11b when the lens barrel 1 is in the tele end state is denoted by reference mark 11b(T).

Here, engagement between the first subordinate cam grooves 4e and the subordinate cam followers 11b is set more loosely than engagement between the first main cam grooves 4d and the main cam followers 11a. More specifically, though the first main cam grooves 4d and the main cam followers 11a are continuously kept being in contact with each other, a gap exists between the first subordinate cam grooves 4e and the subordinate cam followers 11b.

That is, movement of the first lens group holding barrel 11 in the direction along the optical axis O accompanying rotation of the cam barrel 4 is performed by engagements of the three pairs of the first main cam groove 4d and the main cam follower 11a. In the present embodiment, engagement sections of the three pairs of the first subordinate cam groove 4e and the subordinate cam follower 11b also have a structure of, when an external force is applied to the first lens group holding barrel 11 due to dropping and the like, stopping the external force in addition to the engagements of the three pairs of the first main cam groove 4d and the main cam follower 11a. Therefore, falling off of the first lens group holding barrel 11 does not easily occur.

The first subordinate cam grooves 4e are kept open frontward at a front-side end part of the cam barrel 4. When the lens barrel 1 is in the tele end state, engagement with the first subordinate cam grooves 4e is released, and the subordinate cam followers 11b are positioned frontward of the frontward-side end part of the cam barrel 4 as shown in FIG. 6.

On the other hand, the three second cam grooves 4f are formed on the inner circumferential surface 4b of the cam barrel 4. The cam followers 12a of the second lens group holding barrel 12 and the cam followers 13a of the third lens group holding barrel 13 are slidably recessed in the second cam grooves 4f.

In FIG. 12, a position of the cam follower 12a when the lens barrel 1 is in the shortened state is denoted by reference mark 12a(R); a position of the cam follower 12a when the lens barrel 1 is in the wide end state is denoted by reference mark 12a(W); and a position of the cam follower 12a when the lens barrel 1 is in the tele end state is denoted by reference mark 12a(T) In FIG. 12, a position of the cam follower 13a when the lens barrel 1 is in the shortened state is denoted by reference mark 13a(R); a position of the cam follower 13a when the lens barrel 1 is in the wide end state is denoted by reference mark 13a(W); and a position of the cam follower 13a when the lens barrel 1 is in the tele end state is denoted by reference mark 13a(T).

At the time of assembling the lens barrel 1, the second lens group holding barrel 12 is inserted first into the cam barrel 4 in a state that the float key 5 is engaged on an inner side thereof first so that the cam followers 12a are engaged with entrances 4/1 of the second cam grooves 4f. Then, by causing the second lens group holding barrel 12 to relatively rotate relative to the cam barrel, the cam followers 12a are moved along the second cam grooves 4f. Next, the third lens group holding barrel 13 is inserted so that the cam followers 13a are engaged with the entrances 4/1 of the second cam grooves 4f.

Here, when width of an area of the second cam groove 4f in which the cam follower 12a of the second lens group holding barrel 12 is recessed is denoted by W2, and width of an area in which the cam follower 13a of the third lens group holding barrel 13 is recessed is denoted by W3, as shown in FIG. 12, the width W2 of the second cam groove 4f is narrower than the width W3 in the present embodiment. Fitting tolerance between the cam follower 12a and the second cam groove 4f and fitting tolerance between the cam follower 13a and the second cam groove 4f are equal.

Therefore, if, at the time of assembling the lens barrel 1, the third lens group holding barrel 13 is inserted into the cam barrel 4 earlier by mistake, the cam followers 13a advance to parts of the width W2 of the second cam grooves 4f, and slide resistance increases. Thus, by causing the slide resistance to increase when assembly is performed in wrong order, it is possible to cause a worker to be aware of a work mistake.

Figure 13:
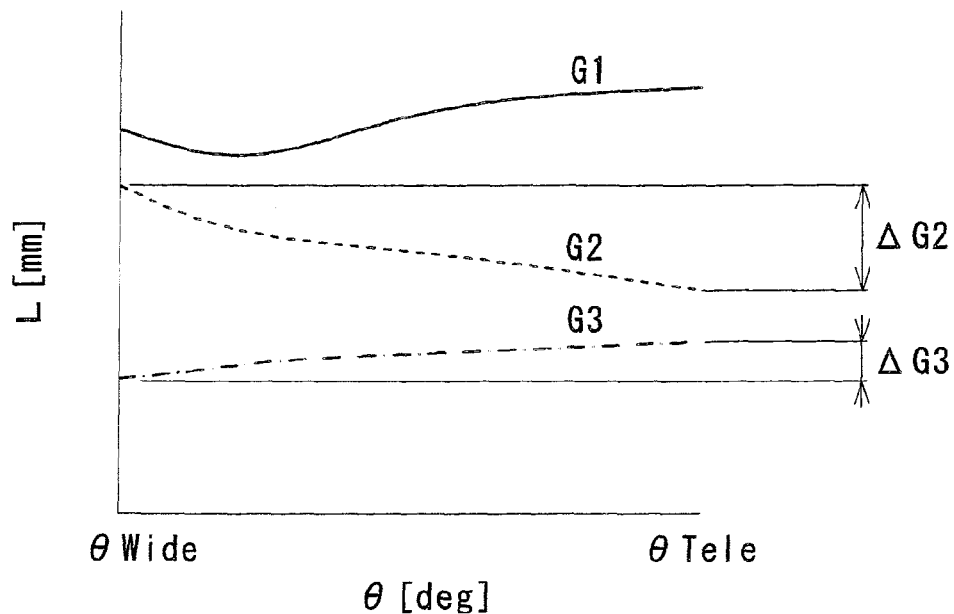
FIG. 13 is a graph showing relationships between a rotation angle θ of the cam barrel and distances L from an image surface to surface tops of first to third lens groups.

FIG. 13 shows relationships between a rotation angle θ of the cam barrel 4 and distances L from an image surface to surface tops of first to third lens groups. In a graph shown in FIG. 13, a horizontal axis indicates the rotation angle θ of the cam barrel 4 between the wide end state and the tele end state. An angle of the cam barrel 4 when the lens barrel 1 is in the wide end state is denoted by θ Wide, and an angle of the cam barrel 4 when the lens barrel 1 is in the tele end state is denoted by θ Tele.

In the graph shown in FIG. 13, a vertical axis indicates the distance L from an image surface to the surface top of each lens group. A curve G1 indicated by a solid line shows a distance from the image surface to the surface top of the first lens group 21; a curve G2 indicated by a broken line shows a distance from the image surface to the surface top of the second lens group 22; and a curve G3 indicated by a dot-dash line shows a distance from the image surface to the surface top of the third lens group 23.

In the lens barrel 1 of the present embodiment, the first lens group 21 moves to the object side after moving to the image side, the second lens group 22 moves to the image side, and the third lens group 23 moves to the object side, at the time of a magnification changing operation from the wide end to the tele end, as shown in FIG. 13. A brightness diaphragm moves together with the third lens group 23.

As described above, in the present embodiment, the first main cam grooves 4d (first cam grooves) in which the cam followers 11a of the first lens group holding barrel 11 are to be recessed are carved on the outer circumferential surface 4a of one cam barrel 4, and the second cam grooves 4f in which the cam followers 12a and 13a of the second lens group holding barrel 12 and the third lens group 23 are to be recessed are carved on the inner circumferential surface 4b. That is, in the present embodiment, it is possible to drive the three lens groups in the direction along the optical axis O by rotation of one cam barrel 4, and it is possible to reduce the number of members overlapped in a radial direction and realize downsizing of the lens barrel 1.

Furthermore, in the present embodiment, by causing the first lens group 21 having a role of correcting an image surface position to move to the object side after moving to the image side at the time of changing magnification from the wide end to the tele end, it is possible to shorten the total length of the lens barrel 1 in the tele end state. It is also possible to secure optical performance in the wide end.

As shown in FIGS. 12 and 13, a travel distance ΔG3 of the third lens group 23 in the direction along the optical axis O is shorter than a travel distance ΔG2 of the second lens group 22 in the direction along the optical axis O at the time of the magnification changing operation from the wide end to the tele end. By causing the travel distance ΔG3 of the third lens group 23 to be shorter, it is possible to reduce an outer diameter of the third lens group 23 and realize downsizing of the lens barrel 1.

In the present embodiment, by causing the second lens group 22 to move to the image side at the time of changing magnification from the wide end to the tele end, it is possible to increase a distance between the first lens group 21 and the second lens group 22 in the tele end state. Thereby, it is possible to shorten the total length of the lens barrel 1 while increasing a magnification change burden on the second lens group 22.

Furthermore, in the present embodiment, by causing the third lens group 23 to move to the object side at the time of changing magnification from the wide end to the tele end, the third lens group 23, which is a lens group for shifting, is also given a role of changing magnification. Thereby, it is possible to suppress an amount of movement of the other lens groups at the time of changing magnification, and it is possible to shorten the total length of the lens barrel 1 while realizing a high variable magnification ratio.

In the lens barrel 1 of the present embodiment, the fourth lens group 24 moves to the object side after moving to the image side, and the fifth lens group 25 moves to the image side at the time of a magnification changing operation from the wide end to the tele end, though it is not shown.

By causing the fourth lens group 24 to move at the time of changing magnification, it is possible to efficiently perform image surface position correction and correction of curvature of field. Furthermore, in the present embodiment, by causing the fifth lens group 25 to have a role of changing magnification, it is possible to suppress an amount of movement of the other lens groups at the time of changing magnification, and it is possible to shorten the total length of the lens barrel 1 while realizing a high variable magnification ratio.

Figure 14:
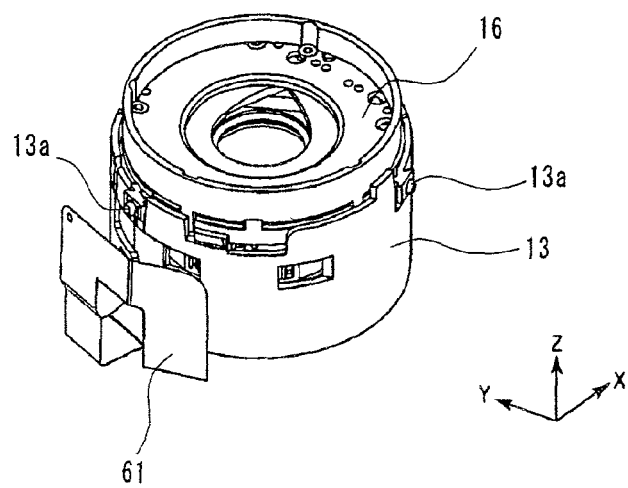
FIG. 14 is a perspective view of the third lens group holding barrel.
Figure 15:
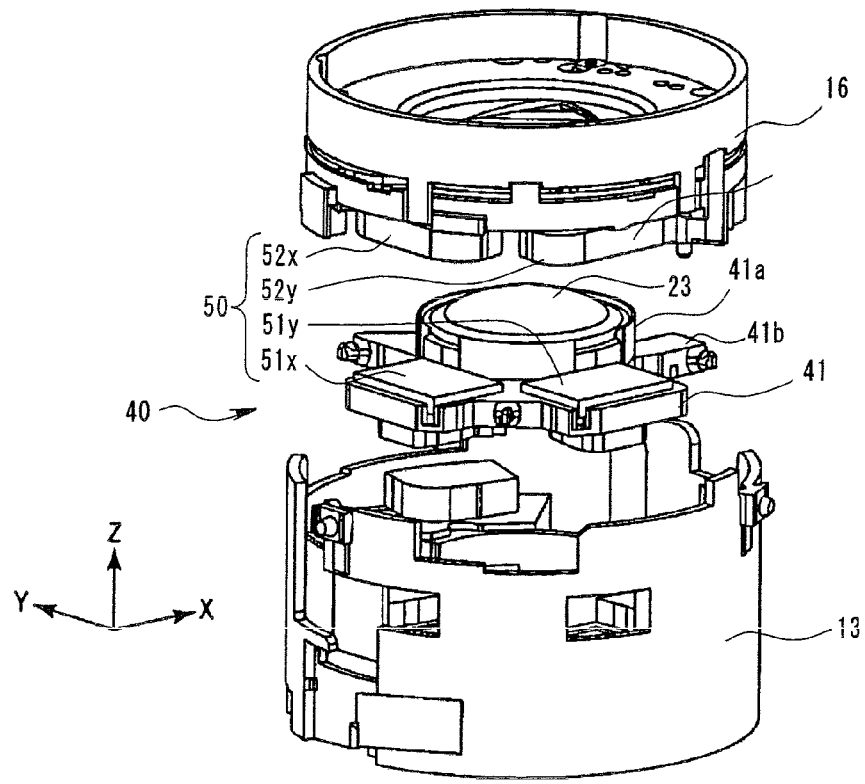
FIG. 15 is an exploded perspective view of a lens shifting mechanism section.
Figure 16:
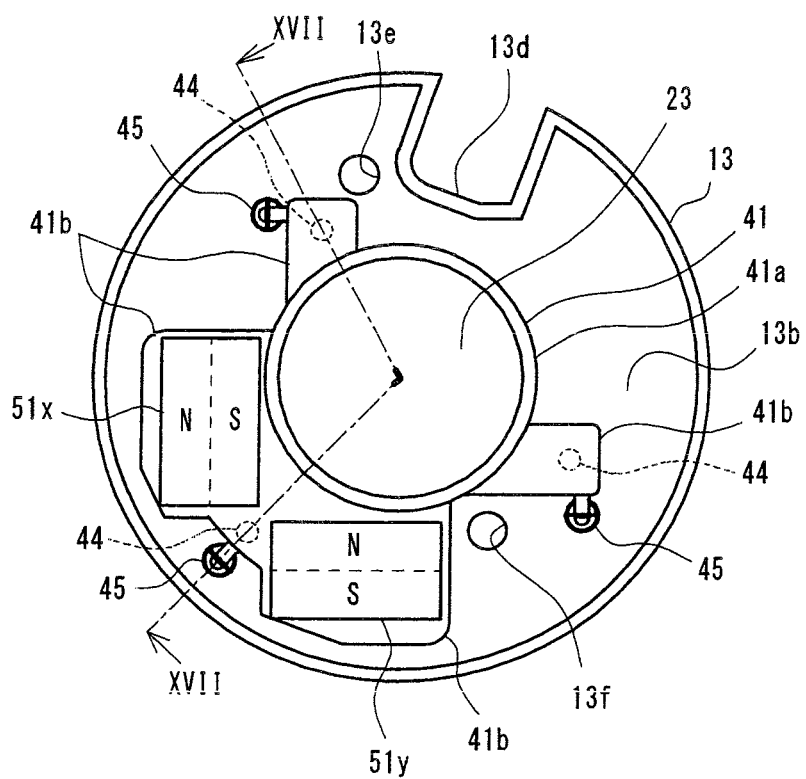
FIG. 16 is a diagram when the third lens group holding barrel and a movable barrel are seen from the front.
Figure 17:
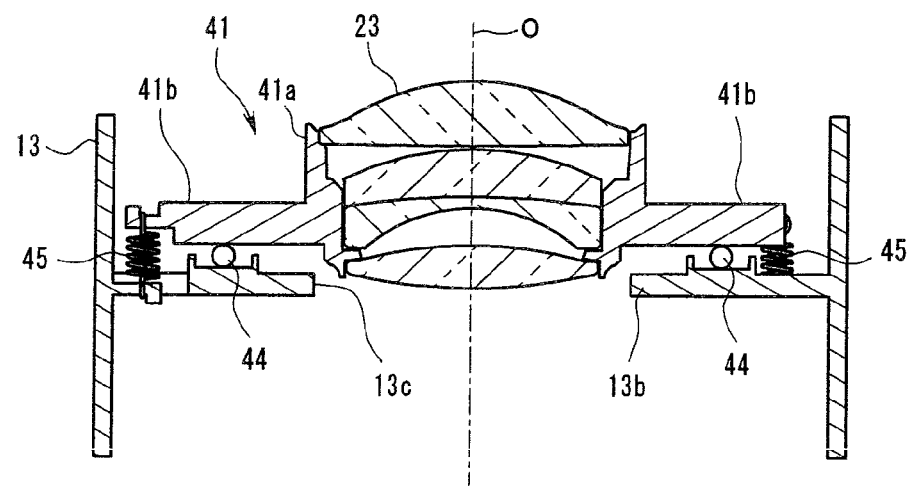
FIG. 17 is a sectional view of a XVII-XVII section in FIG. 16.

Next, a detailed configuration of the third lens group holding barrel 13 will be described. As stated before, the third lens group holding barrel 13 holds the shutter/diaphragm unit 16 and the lens shifting mechanism section 40 in addition to the third lens group 23. FIG. 14 is a perspective view of the third lens group holding barrel 13. FIG. 15 is an exploded perspective view of the lens shifting mechanism section 40. FIG. 16 is a diagram when the third lens group holding barrel 13 and a movable barrel 41 are seen from the front. FIG. 17 is a sectional view of a XVII-XVII section in FIG. 16.

The lens shifting mechanism section 40 is configured to cause the third lens group 23 to move along the plane orthogonal to the optical axis O. In the photographing optical system of the present embodiment, an image formation position on an image surface moves by the third lens group 23 moving along the plane orthogonal to the optical axis O.

As shown in FIG. 15, the lens shifting mechanism section 40 is configured, being provided with the movable barrel 41 to which the third lens group 23 is fixed, and a lens shifting actuator 50 which generates power for causing the movable barrel 41 to move along the plane orthogonal to the optical axis O.

The movable barrel 41 has a substantially cylindrically shaped cylindrical section 41a inside which the third lens group 23 is fixed, and a flange section 41b which extends from an outer circumferential surface of the cylindrical section 41a toward a radial direction outer side. The movable barrel 41 is arranged to be relatively movable along the plane orthogonal to the optical axis O relative to the third lens group holding barrel 13.

More specifically, the movable barrel 41 has three balls 44 between a back of the flange section 41b and a front of a plate-like support section 13b substantially orthogonal to the optical axis O which projects to the inner side of the third lens group holding barrel 13 as shown in FIGS. 15 and 16. At three positions near the three balls 44, a coil spring 45 which biases the flange section 41b to the support section 13b is provided between the flange section 41b and the support section 13b. The movable barrel 41 can relatively move along the plane orthogonal to the optical axis O relative to the third lens group holding barrel 13 by rolling of the balls 44.

Note that a through hole 13c through which the optical axis O passes is formed in the support section 13b provided in the third lens group holding barrel 13. Through holes 13d, 13e and 13f penetrating in a direction substantially parallel to the optical axis O are also formed in the support section 13b.

The through hole 13d is formed at a position where the through hole 13d is overlapped with the stepping motor 35a and the screw 35b of the fifth lens group driving unit 35 when seen from the direction along the optical axis O. When the lens barrel 1 is in the shortened state, the screw 35b projecting frontward from the base section 2 passes through the through hole 13d.

The through holes 13e and 13f are formed at positions where the through holes 13e and 13f are overlapped with the guide shaft 18 and the rotation stopping shaft 19, respectively, when seen from the direction along the optical axis O. When the lens barrel 1 is in the shortened state, the guide shaft 18 and the rotation stopping shaft 19 projecting frontward from the base section 2 pass through the through holes 13e and 13f.

The lens shifting actuator 50 has a configuration of a so-called voice coil motor which generates driving force by causing electric current to flow through a coil in a magnetic field of a permanent magnet. Since the principle of the voice coil motor is well known, description thereof will be omitted.

The lens shifting actuator 50 includes a permanent magnet 51x and a coil 52x for generating driving force in a direction along the X axis, and a permanent magnet 51y and a coil 52y for generating driving force in a direction along the Y axis.

The permanent magnets 51x and 51y are fixed to the flange section 41b of the movable barrel 41. The coils 52x and 52y are fixed on a rear side of the shutter/diaphragm unit 16.

The permanent magnets 51x and 51y and the coils 52x and 52y constituting the lens shifting actuator 50 are arranged in a lateral direction of the third lens group 23, that is, in a radial direction outer side of the third lens group 23 in the third lens group holding barrel 13. In other words, the permanent magnets 51x and 51y and the coils 52x and 52y constituting the lens shifting actuator 50 are arranged at a position where they are overlapped with the third lens group 23 in the direction along the optical axis O.

Here, when the lens barrel 1 is seen from the direction along the optical axis O, the lens shifting actuator 50 is arranged at a position where the lens shifting actuator 50 is not overlapped with the fifth lens group driving unit 35, the guide shaft 18 or the rotation stopping shaft 19 which are provided on the base section 2 as shown in FIG. 9.

More specifically, when the digital camera 100 in the upright state is seen from the front, the lens shifting actuator 50 is arranged in left-side and lower-side areas of the third lens group 23. When the digital camera 100 in the upright state is seen from the front, the permanent magnet 51x and the coil 52x are arranged on the left of the third lens group 23, and the permanent magnet 51y and the coil 52y are arranged below the third lens group 23.

Note that the lens shifting actuator 50 includes a yoke made of a magnetic substance for controlling a route of a magnetic force line, a hall element for detecting a relative position of the movable barrel 41 relative to the third lens group 23, and the like, though they are not shown.

The shutter/diaphragm unit 16 is fixed frontward of the third lens group holding barrel 13. The coils 52x and 52y stated before are arranged such that they project backward from the shutter/diaphragm unit 16.

The shutter/diaphragm unit 16 is provided with a shutter actuator 16a which drives a shutter, a diaphragm actuator 16b which drives a diaphragm and an ND filter actuator 16c which drives an ND filter. The shutter actuator 16a, the diaphragm actuator 16b and the ND filter actuator 16c project backward of the shutter/diaphragm unit 16 and are positioned in a lateral direction of the third lens group 23 as shown in the sectional view of FIG. 9. In other words, rear ends of the shutter actuator 16a, the diaphragm actuator 16b and the ND filter actuator 16c are positioned backward of a front end of the third lens group 23, and the shutter actuator 16a, the diaphragm actuator 16b and the ND filter actuator 16c are arranged at positions where they are overlapped with the third lens group 23 in the direction along the optical axis O.

Here, when the lens barrel 1 is seen from the direction along the optical axis O, the shutter actuator 16a, the diaphragm actuator 16b and the ND filter actuator 16c are arranged at positions where they are not overlapped with the lens shifting actuator 50, the fifth lens group driving unit 35, the guide shaft 18 or the rotation stopping shaft 19 as shown in FIG. 9.

In the lens barrel 1 of the present embodiment, when the lens barrel 1 enters the shortened state, and the third lens group holding barrel 13 comes nearest to the base section 2, a frontward-side end part of each of the fifth lens group driving unit 35, the guide shaft 18 and the rotation stopping shaft 19 which project frontward from the base section 2 is positioned in the lateral direction of the third lens group 23.

As stated before, since the lens shifting actuator 50, the shutter actuator 16a, the diaphragm actuator 16b and the ND filter actuator 16c which are members arranged in the lateral direction of the third lens group 23 in the third lens group holding barrel 13 are arranged at positions where they are not overlapped with the fifth lens group driving unit 35, the guide shaft 18 or the rotation stopping shaft 19 when seen from the direction along the optical axis O, they never interfere.

Note that power supply and input/output of control signals to the lens shifting actuator 50, the shutter actuator 16a, the diaphragm actuator 16b and the ND filter actuator 16c are performed via a second flexible printed circuit board 61 shown in FIG. 14. The second flexible printed circuit board 61 is drawn out to the outer circumferential surface of the fixed barrel 3 as shown in FIG. 8. A part of the second flexible printed circuit board 61 which is drawn out to the outer circumferential surface of the fixed barrel 3 is arranged to be along the outer circumferential surface of the fixed barrel 3 and electrically connected to a first flexible printed circuit board 60 with the image pickup device 102 implemented thereon, via a planar connector 62. The first flexible printed circuit board 60 is connected to a control board of the digital camera 100 not shown at a connection section 60a.

As described above, in the lens barrel 1 of the present embodiment, the shutter actuator 16a, the diaphragm actuator 16b and the ND filter actuator 16c are arranged around the third lens group 23, which is a movable lens in a lens-shift type image stabilization mechanism, in addition to the lens shifting actuator 50.

Furthermore, in the lens barrel 1 of the present embodiment, the guide shaft 18, the rotation stopping shaft 19 and the fifth lens group driving unit 35 for forward/backward driving the fifth lens group 25 are arranged on an inner side of the outer diameter of the third lens group holding barrel 13 and on an outer side of the outer diameter of the third lens group 23 when seen from the direction along the optical axis O.

The guide shaft 18, the rotation stopping shaft 19 and the fifth lens group driving unit 35 for forward/backward driving the fifth lens group 25 project frontward from the base section 2. When the lens barrel 1 is in the shortened state, the guide shaft 18, the rotation stopping shaft 19 and the fifth lens group driving unit 35 are arranged at positions where they do not interfere with the lens shifting actuator 50, the shutter actuator 16a, the diaphragm actuator 16b and the ND filter actuator 16c arranged around the third lens group 23 as shown in FIG. 9.

In the lens barrel 1 of the present embodiment having such a configuration, an outer diameter of the whole lens barrel 1 can be reduced by arranging the guide shaft 18, the rotation stopping shaft 19 and the fifth lens group driving unit 35 for forward/backward driving the fifth lens group holding barrel 15 on the inner side of the outer diameter of the third lens group holding barrel 13. Furthermore, by causing the third lens group holding barrel 13 having the lens shifting actuator 50 to be near to the base section 2 during the shortened state, the total length during the shortened state can be shortened.

Figure 18:
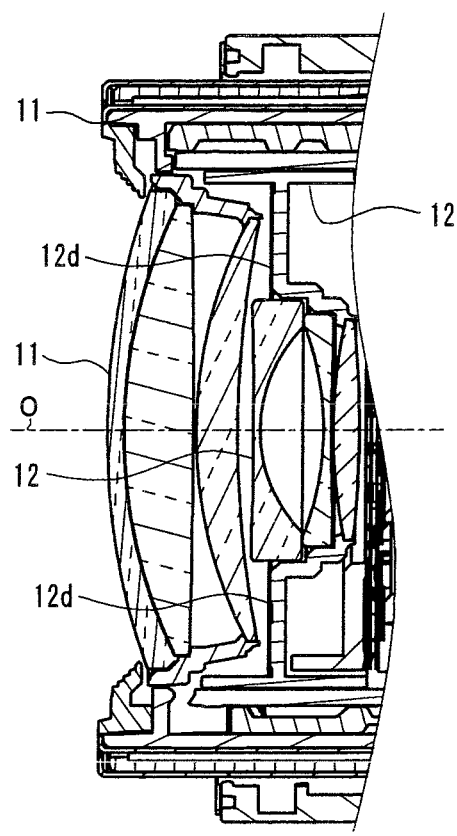
FIG. 18 is a sectional view showing a front surface part of the second lens group holding barrel.

In the photographing optical system of the present embodiment, an outer diameter of the first lens group 21 is relatively larger than an outer diameter of the second lens group 22. Therefore, when the lens barrel 1 is in the shortened state, a part of a front section 12*d* of the second lens group holding barrel 12 can be visually confirmed from the front through the first lens group 21 as shown in FIG. 18.

Accordingly, in the lens barrel 1 of the present embodiment, a character string indicating at least one of a model, a product name, a brand name, a manufacturer name and lens specifications is written in an area on the front section 12*d* of the second lens group holding barrel 12 which can be visually confirmed through the first lens group 21 when the lens barrel 1 is in the shortened state. Note that the writing of the character string is performed, for example, by printing.

By writing the character string on the front section 12*d* of the second lens group holding barrel 12 arranged on an inner side of the lens barrel 1 as described above, it is possible to prevent the writing from fading or disappearing due to wear and tear.

Note that the present invention is not limited to the embodiment described above but can be appropriately changed within a range not departing from the spirit or idea of the invention which can be read from the Claims or the whole specification, and a lens barrel for which such a change has been made is also included in the technical scope of the present invention.

The lens barrel according to the present invention is not limited to a form of being provided for a so-called digital camera. It goes without saying that the lens barrel may be in a form of being provided for an electronic apparatus equipped with an image pickup function, such as a mobile communication terminal, a game machine and a digital media player.

As an example of an electronic apparatus provided with the lens barrel according to the present invention, an image pickup apparatus is conceivable which is configured, being provided with an image pickup device, a wireless communication section equipped with a wireless communication function such as a wireless LAN, and a control section and is configured to be communicable with a mobile communication terminal such as a so-called smartphone and a tablet-type terminal via the wireless communication section. The image pickup apparatus executes a magnification changing operation, an image pickup operation, an image processing operation of an image, which is an image pickup result, image transmission and reception operations to and from the mobile communication terminal, and the like in response to instruction inputs to the mobile communication terminal by a user. That is, the image pickup apparatus can be remotely operated with the use of the mobile communication terminal.

Furthermore, the image pickup apparatus may be in a form of using an image display device of a mobile communication terminal connected via the wireless communication section as a separated view finder without being provided with an image display device. In this case, the image pickup apparatus may be provided with an adapter which can be mechanically fixed to a body of the mobile communication terminal.

What is claimed is:

1. A lens barrel holding a photographing optical system which is a zoom lens constituted by five groups of a first lens group with positive refractive power, a second lens group with negative refractive power, a third lens group with positive refractive power, a fourth lens group with negative refractive power and a fifth lens group with positive refractive power, the lens barrel being capable of shortening a total length thereof when not taking photographs, comprising:

a cylindrical cam barrel arranged to be rotatable around an optical axis;

a first lens driving section driving the cam barrel around the optical axis at a time of a magnification changing operation of the photographing optical system;

a plurality of first cam grooves carved on an outer circumferential surface of the cam barrel;

a plurality of second cam grooves carved on an inner circumferential surface of the cam barrel;

a third lens group holding barrel formed in a cylindrical shape, the third lens group holding barrel including, in the cylindrical shape, a moveable barrel holding the third lens group movable in a direction orthogonal to the optical lens; and a lens shifting mechanism section driving the movable barrel holding the third lens in the direction orthogonal to the optical axis in the third lens group holding barrel, the lens shifting mechanism section including a biasing spring biasing the movable barrel to the third lens group holding barrel in the optical axis direction, and a ball sandwiched between the third lens group holding barrel and the movable barrel by a biasing force of the biasing spring in the optical axis direction, wherein a first lens group holding barrel holding the first lens group has a plurality of cam followers that are recessed in the first cam grooves; and each of a second lens group holding barrel holding the second lens group and the third lens group holding barrel holding the third lens group has a plurality of cam followers that are recessed in the second cam grooves.

2. The lens barrel according to claim 1, wherein, at a time of a magnification changing operation from a wide end to a tele end, a travel distance of the third lens group in a direction along an optical axis O is shorter than a travel distance of the second lens group in the direction along the optical axis O.

3. The lens barrel according to claim 1, wherein, at a time of a magnification changing operation from a wide end to a tele end, the first lens group moves to an object side after moving to an image side; the second lens group moves to the image side; and the third lens group moves to the object side.

4. The lens barrel according to claim 1, wherein the first cam grooves include a plurality of first main cam grooves and a plurality of first subordinate cam grooves having a same cam profile as the first main cam grooves;

the first main cam grooves and the first subordinate cam grooves are alternately arranged in a circumferential direction on the outer circumferential surface of the cam barrel; and the first subordinate grooves are arranged frontward of the first main cam grooves and opened frontward at a front-side end part of the cam barrel; and, when the lens barrel is in a tele end state, engagement between the first subordinate cam grooves and cam followers is released, and the cam followers are positioned frontward of the front-side end part of the cam barrel.

5. The lens barrel according to claim 1, wherein an outer diameter of the first lens group is larger than an outer diameter of the second lens group, and a character string is printed on a front surface part perpendicular to an optical axis of the second lens group holding barrel.

6. An electronic apparatus comprising the lens barrel according to claim 1 and an image pickup device.

7. A lens barrel assembly comprising:
- a photographing optical system which is a zoom lens having an optical axis and being constituted by
  - a first lens group with positive refractive power,
  - a second lens group with negative refractive power,
  - a third lens group with positive refractive power,
  - a fourth lens group with negative refractive power, and
  - a fifth lens group with positive refractive power;
- a cylindrical cam barrel arranged to be rotatable around the optical axis;
- a first lens driving section driving the cam barrel around the optical axis at a time of a magnification changing operation of the photographing optical system;
- a plurality of first cam grooves carved on an outer circumferential surface of the cam barrel;
- a plurality of second cam grooves carved on an inner circumferential surface of the cam barrel;
- a first lens group holding barrel holding the first lens group and having a plurality of cam followers that are recessed in the first cam grooves;
- a second lens group holding barrel holding the second lens group and having a plurality of cam followers that are recessed in the second cam grooves; and
- a third lens group holding barrel holding the third lens group and having a plurality of cam followers that are recessed in the second cam grooves, wherein a length of the photographing optical system can be shortened when not taking photographs.

* * * * *